(12) United States Patent
Shiban

(10) Patent No.: US 7,534,399 B2
(45) Date of Patent: May 19, 2009

(54) HAZARDOUS GAS ABATEMENT SYSTEM USING ELECTRICAL HEATER AND WATER SCRUBBER

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 1052 days.

(21) Appl. No.: 10/796,120

(22) Filed: Mar. 10, 2004

(65) Prior Publication Data

US 2005/0201913 A1 Sep. 15, 2005

(51) Int. Cl.
B01D 50/00 (2006.01)
(52) U.S. Cl. ...................... 422/173; 422/177
(58) Field of Classification Search ................. 422/168, 422/173, 177
See application file for complete search history.

(56) References Cited

U.S. PATENT DOCUMENTS

| | | | |
|---|---|---|---|
| 4,801,437 A | 1/1989 | Konagaya et al. |
| 5,271,908 A | 12/1993 | Shiban |
| 5,353,829 A | 10/1994 | Shiban |
| 5,662,722 A | 9/1997 | Shiban |
| 5,699,826 A | 12/1997 | Shiban |
| 5,759,498 A | 6/1998 | Sheu et al. |
| 5,832,843 A | 11/1998 | Park et al. |
| 5,997,824 A | 12/1999 | Kim |
| 6,030,584 A | 2/2000 | Shiban |
| 6,030,585 A | 2/2000 | Shiban |
| 6,084,148 A | 7/2000 | Shiban |
| 6,153,150 A | 11/2000 | Moore et al. |
| 6,315,960 B1 | 11/2001 | Shiban |
| 6,333,010 B1 | 12/2001 | Holst et al. |
| 6,423,284 B1 | 7/2002 | Arno et al. |
| 6,425,754 B1 | 7/2002 | Lindskog |
| 6,464,944 B1 | 10/2002 | Moore et al. |
| 6,511,641 B2 | 1/2003 | Herman et al. |
| 6,514,471 B1 | 2/2003 | Hsiung et al. |
| 6,544,483 B1 | 4/2003 | Kim |
| 6,627,162 B1 | 9/2003 | Chen |
| 7,033,550 B2 | 4/2006 | Kanno et al. |
| 2001/0000724 A1 | 5/2001 | Choate et al. |
| 2001/0001645 A1 | 5/2001 | Lee et al. |
| 2002/0018737 A1 | 2/2002 | Holst et al. |
| 2002/0081240 A1 | 6/2002 | Kim |
| 2003/0047070 A1 | 3/2003 | Flippo et al. |
| 2003/0049182 A1 | 3/2003 | Hertzler et al. |
| 2003/0138367 A1 | 7/2003 | Brady et al. |
| 2003/0175176 A1 | 9/2003 | Ikeda et al. |

FOREIGN PATENT DOCUMENTS

| | | |
|---|---|---|
| FR | 97 10479 | 1/1999 |
| GB | 2303803 | 7/1999 |
| JP | 2723474 | 8/1995 |
| WO | WO 02/058824 | 8/2002 |

*Primary Examiner*—Edward M Johnson
(74) *Attorney, Agent, or Firm*—James Creighton Wray

(57) ABSTRACT

A hazardous gas abatement system decontaminates an exit gas stream containing global warming gases using an electrical heater and a water scrubber. One or more top flow hazardous gas inlets introduce hazardous gases into a heater compartment. Air or oxygen is introduced into a separate chamber for dynamic oxidation and cooling. The streams are mixed and oxygen reacts with the hazardous gases. Solid particulates from the reaction are removed by a filter in a quick disconnect bottom chamber. Filtered exhaust gases flow upward in an exhaust chamber surrounding the heater compartment and through water spray scrubbers. A cleaning ring mounted on an eccentric rod cleans particles from the outside of the internal heater, and the inside of the external heater. An air cylinder drives the eccentric rod and cleaning ring down and up between the heaters and stores the ring above the gas inlets.

14 Claims, 2 Drawing Sheets

HAZARDOUS GAS ABATEMENT SYSTEM USING ELECTRICAL HEATER AND WATER SCRUBBER

BACKGROUND OF THE INVENTION

The present invention relates to a method and apparatus for hazardous gas abatement and emission control. Contaminated gas is decomposed, cleaned and neutralized. The present invention is particularly useful for global warming gases and other hard to decompose gases. These gases may include perflourocarbons (PFCs), tetraflouromethane ($CF_4$), hexaflouroethane ($C_2F_6$) and many other ozone depleting global warming and greenhouse gases. The present system is also useful for decomposing the exit stream of a semiconductor process by removing gases such as arsine ($AsH_3$) or phosphine ($PH_3$). High temperatures are required to clean, neutralize and decompose these types of gases.

Existing systems do not provide adequate heating to effectively cleanse exit gas streams of global warming gases. Previous gas cleaning systems include controlled decomposition/oxidation (CDO) and others. These previous systems suffered from low efficiency in performance and considerable downtime of equipment during maintenance. Industries, such as the semiconductor industry, have a considerable need for gas cleansing systems in order to comply with environmental emissions codes and regulations.

In existing gas cleaning systems heaters are used. However, the heaters insufficiently heat all of the gases, and the heaters become fouled and unable to efficiently transfer heat. They also become so burdened with particulate contaminants or reaction products as to interfere with free flow of gases through the cleaning systems. Periodic cleaning of the heaters and the chambers becomes necessary, which requires shutting down of the systems or taking the treatment apparatus off line, resulting in duplicate systems and greater expense. If the systems are not cleaned contaminated gases will be released.

Needs exist for improved apparatus and systems for cleaning heater compartments in contaminated gas treatment methods and apparatus.

Needs still exist for improved systems for neutralizing, pacifying and cleaning contaminated chemical process exhaust and waste gases.

Needs exist for improved systems, which efficiently neutralize chemical process exhaust gas hazardous components and contaminates. The system should ensure complete or substantially complete neutralization and pacification of any out flowing contaminant gas in the gas stream to be neutralized. Needs exist for systems that are simple and inexpensive to build and to operate and that do not require a fuel source to operate.

Needs exist for systems that are capable of handling spent process gas streams that have contaminate gas concentrations from trace to substantial amounts in volumes of cubic centimeters to several tens or hundreds of liters per minute.

SUMMARY OF THE INVENTION

The present invention is a hazardous gas abatement system for reacting global warming, greenhouse and/or ozone depleting gases using an electrical heater and a water scrubber. The present invention provides higher temperatures and increased contact surfaces for decomposing the subject hazardous gases when compared with previous systems.

Preferably, but not limited to, one or more, or about one to four top flow hazardous gas inlets introduce hazardous gases into a heater compartment where the toxic gases are heated to approximately 1100 C. The hazardous gases flow into the heater compartment surrounded by an outer heater. An inner heater is positioned with respect to the outer heater to create additional heat and contact surfaces for higher gas temperatures. An air inlet introduces air into the cleaning system separate from the hazardous gases. The air is fed around the outside of an external heater for cooling and dynamic oxidation. After the hazardous gases and the air are heated, the two gas streams flow downward in the apparatus and meet below the heater compartment. Oxygen in the air reacts with the heated hazardous gases. When the gases have reacted, the exit gas stream passes through a filter at the base of the cleaning device for removal of solids. A quick disconnect clamp on the bottom of the cleaning system is used to periodically remove the filter for cleaning and removal of accumulated solids. After passing through the filter, exhaust gases flow upward in a chamber outside the heater compartment and then through water spray scrubbers that cool and scrub the gases.

A cleaning ring with an eccentric shaft cleans the entry point of the hazardous gas inlets, the outside of the internal heater, and the inside of the external heater. An air cylinder drives the eccentric shaft up and down between the heaters and along the gas inlets. The cleaner removes particles from the exposed surfaces of the heaters as it moves. The cleaning ring has an inner and outer surface for cleaning the inner heater and outer heater simultaneously. When not in use, the cleaner is positioned above the first and second gas inlets and away from the passage of contaminant gases and oxygen. In addition to cleaning the surfaces of the heaters, the cleaner also cleans the entry points of the gas inlets to prevent build-ups.

Preferably, but not exclusively, the heater compartment, outer heater and inner heater are cylindrical. The cleaner is annular and coaxial with the outer heater. An operator, offset from a center of the cleaning system, moves the cleaner between the outer surface and the inner heater surfaces. The operator is a reciprocation device extending from an end of the treatment apparatus and a rod extending into the heater compartment and connected eccentrically to the annular cleaner for extending in a space between the heaters as the reciprocating device moves the cleaner.

Water sprays are also used for cooling and scrubbing of exhaust gases. A water scrubbing zone is positioned after the filter, but before exhaust gas leaves the apparatus. Moisture may also be introduced in the hazardous gas inlet or heater compartment in the form of steam or water. This addition of moisture reduces contaminants and possible damage to the heater compartment and other components by converting fluorine gas to hydrofluoric acid.

The present invention efficiently neutralizes, pacifies and cleans contaminated chemical process exhaust and waste gases and allows for easy cleaning of the heater compartment. The present invention ensures complete or substantially complete neutralization and pacification of any out flowing contaminant gas in the gas stream to be neutralized. The system is also simple and inexpensive to build and to operate. The systems is capable of handling spent process gas streams that have contaminate gas concentrations from trace to substantial amounts in volumes of cubic centimeters to several tens or hundreds of liters per minute.

These and further and other objects and features of the invention are apparent in the disclosure, which includes the above and ongoing written specification, with the drawings.

DETAILED DESCRIPTION OF THE PREFERRED EMBODIMENTS

The present invention is a hazardous gas abatement system for reacting global warming, greenhouse and/or ozone depleting gases using an electrical heater and a water scrubber. The present invention ensures complete or substantially complete neutralization and pacification of any out flowing contaminant gas in the gas stream to be neutralized.

Figure 1:
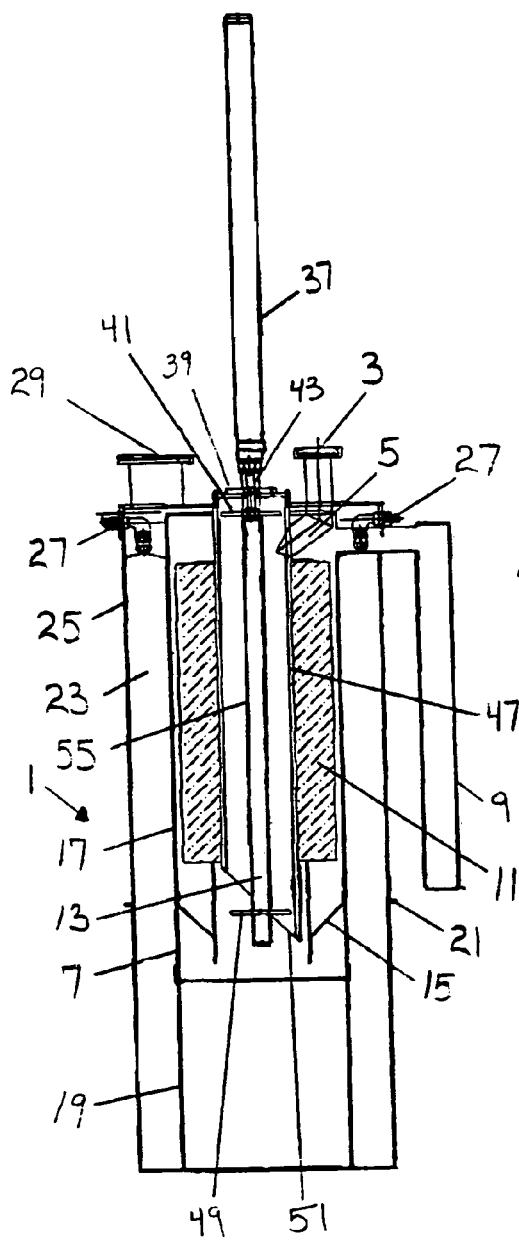
FIG. 1 is a side cross sectional view of the hazardous gas abatement system.

FIG. 1 is a side cross sectional view of the hazardous gas abatement system 1. Contaminated gases that are in need of neutralization and pacification are taken from a process stream. The contaminated gases feed into the hazardous gas abatement system 1 through a top flow hazardous gas inlet 3. The hazardous gas inlet 3 introduces the contaminated gases through an entry point 5 that is attached to a heater compartment 7. In order to carry out the neutralization and pacification of the contaminated gas, the contaminated gas is heated to temperatures of approximately 1100 C.

An air inlet 9 introduces an air stream into the cleaning system 1. Air is introduced near the top of the abatement system 1. Both the contaminated gas stream and air stream may be pumped into the abatement system 1 or may be drawn into the system 1 by a slight negative pressure within the vessel.

The contaminated gases leave the entry point 5 and move into the top of the heater compartment 7. Gas flow in the heater compartment 7 is in a generally downward direction. At least one electric heater 11 is located within the heater compartment 7. A second electric heater 13 may also be present. Walls 15 and other devices control gas flow and provide support for structures within the heater compartment 7. The contaminated gases flow downward through the heater compartment 7, between the inner 13 and outer 11 heaters. The use of a second heater 13 creates a second heat source and increases contact surfaces to ensure higher gas temperatures. The electric heaters 11, 13 heat the contaminated gases to remove some of the contaminants.

After entering the system 1, the air stream flows downward between the external heater 11 and the heater compartment walls 17. Dynamic oxidation occurs as the air flows around the external heaters 11 and the insulation on the heater 11 is cooled. The pre-heated air stream exits the region between the external heater 11 and the heater compartment walls 17 through vent 15.

At the base of the heater compartment 7, the contaminated gases exit the heater compartment 7 and mix with the pre-heated air stream. The two gas streams react to decompose the contaminated gases. At the base of the system 1, a filter 19 removes reacted solids from the combined gas stream. The filter 19 is periodically removed for maintenance and to clean out accumulated solids by means of a quick disconnect clamp 21 on the bottom of the heater compartment 7.

The filtered exhaust gases flow upward in a chamber 23, outside the heater compartment 7 and inside the outer wall 25 of the apparatus 1. Prior to exiting the abatement system 1, the filtered exhaust gases pass through a system of water spray scrubbers 27 that cool the exit stream and further remove contaminants from the exhaust gas. After being scrubbed by the water sprays 27, the substantially cleaned exhaust gases are exhausted through an exhaust vent 29. The exhaust is composed of water vapor, air and cleaned gas.

Figure 2:
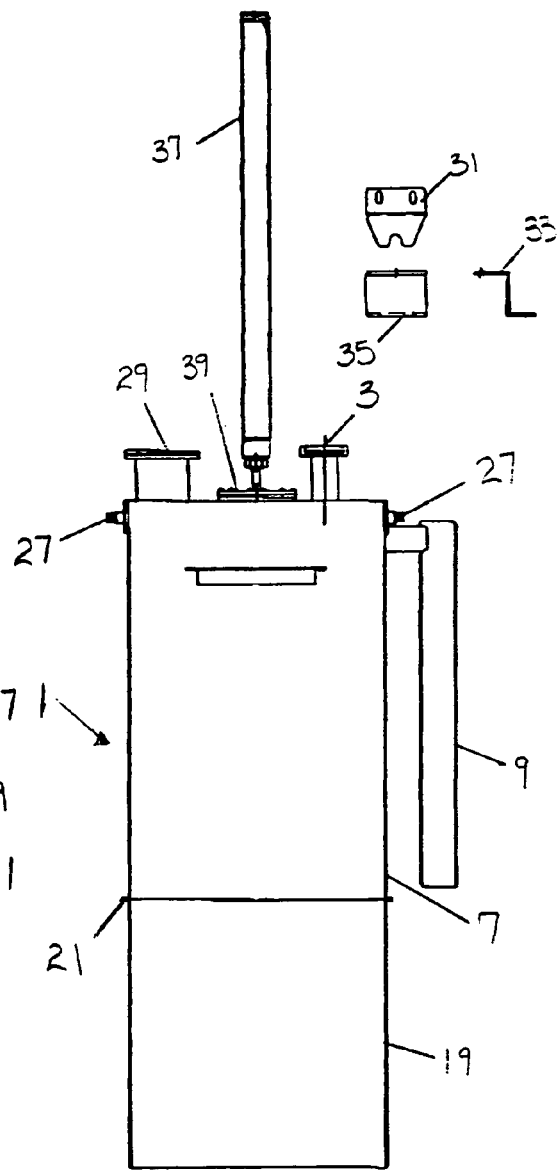
FIG. 2 is a side view of the hazardous gas abatement system.

FIG. 2 is an exterior side view of the hazardous gas abatement system 1. FIG. 2 also shows components 31, 33, 35 that are used to secure an air cylinder 37 onto the top 39 of the abatement system 1.

Figure 3:
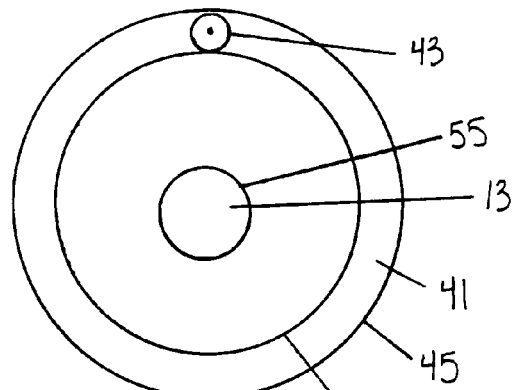
FIG. 3 is a top view of the cleaning ring with eccentric shaft.

FIG. 3 is a top view of a cleaning ring 41 with an eccentric shaft 43. The decomposition of the contaminated gases results in the buildup of a solid residue within the heater compartment 7. The filter 19 captures and collects many of the solid particles created from the process. However, decomposition occur throughout the length of the heater compartment 7, including along the exposed surfaces of the heaters 11, 13. As a result, solid particles form on the heaters 11, 13 and reduce the heating efficiency of the heaters 11, 13. In order for the abatement system 1 to work effectively, the heaters 11, 13 must be cleaned frequently to remove solid particles on the heaters. In previous systems, the process needed to be shut down and opened for cleaning. In the present invention, the heaters 11, 13 can be cleaned without extended disruptions of the abatement system 1.

In an embodiment of the present invention with one heater, the cleaning ring 41 has an outer surface 45 in close proximity to the internal surface 47 of the heater 11. The outer surface 45 of the cleaning ring 45 is used to scrape solid particles off the heater 11. The cleaning ring 41 is positioned above the hazardous gas inlet 5 when the cleaning ring 41 is not in use. This positioning keeps the cleaning ring 41 away from the passage of contaminant gases, preventing solid buildup on the cleaning ring 41 itself and preventing the cleaning ring 41 from disturbing the flow of gases in the heater compartment 7.

During cleaning, the cleaning ring 41 is depressed from its initial position above the gas inlet 3 by the air cylinder 37. The air cylinder 37 provides force necessary to propel the cleaning ring 41 along the sides of the heater 11 while scraping solid particulates off the heater 11 and down toward the filter 19. In addition to cleaning the surface of the heater 11, the cleaning ring 41 also cleans the entry points of the gas inlets 3 to prevent buildups that would stifle the flow of gases. The cleaning ring 41 proceeds down the inner walls 47 of the heater 11 until it reaches a stop 49. The inner walls 47 of the heater 11 are designed such that the cleaning ring 41 scrapes solid buildup from the entirety of some of the walls 47, but not all of the walls 47. Part of the inner walls 47 are tapered 51 and extend below the stop 49 to prevent the cleaning ring 41 from becoming misaligned. When the cleaning process is completed, the air cylinder 37 retracts the cleaning ring 41 to its initial position.

In an embodiment of the present invention with multiple heaters 11, 13, a cleaning ring 41 has an inner 53 and outer 45 surface to clean an inner 13 and outer 11 heater of solid particles. The outer surface 45 of the cleaning ring 41 is in proximity to the inner surface 47 of the first heater 11. The inner surface 53 of the cleaning ring 41 is in proximity to an outer surface 55 of the second heater 13. The cleaning ring 41 encircles the second heater 13. The cleaning process with multiple heaters 11, 13 is similar to the cleaning process for a single heater 11. An air cylinder 37 depresses the cleaning ring 41 until reaching a stop 49. The air cylinder 37 then retracts the cleaning ring 41 to its initial position. The air cylinder 37 acts on the cleaning ring 41 through an offset shaft 43.

The cleaning ring 41 with its eccentric shaft 43 is used to clean the entry point of the gas inlets 3, the outside of the internal heater 55, and the inside of the external heater 47. The cleaning ring 41 removes particles from the heaters' 11, 13 exposed surfaces as it moves. The cleaning ring 41 cleans the inner heater 13 and outer heater 11 simultaneously. There is no need to disassemble the abatement system 1 in order to remove solid particles from the heaters 11, 13.

Figure 4:
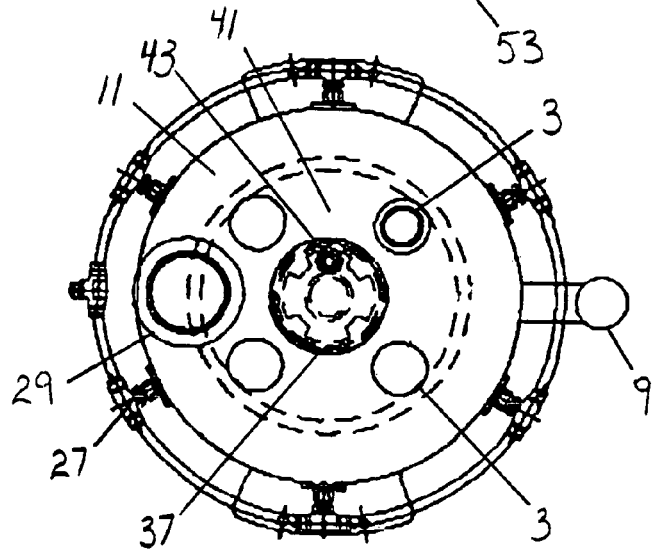
FIG. 4 is a top view of the hazardous gas abatement system.

FIG. 4 is a top view of the exterior of the hazardous gas abatement system 1. In a preferred embodiment of the present invention, the heater compartment 7, outer heater 11 and inner heater 13 may be concentric cylinders. As a result, the cleaning ring 41 is annular and coaxial with the outer heater 11. An operator 43, offset from a center of the apparatus 1, moves the cleaning ring 41 between the outer 55 and the inner 47 heater surfaces. The operator 43 is a reciprocation device extending from an end of the treatment apparatus 1 and a rod extending into the heater compartment 7. The operator 43 is connected eccentrically to the annular cleaner 41 for extending in a space between the heaters 11, 13 as the reciprocating device moves the cleaning ring 41. The cleaning ring 41 is placed in close proximity to the heater surfaces 47, 55 to ensure adequate cleaning, but the cleaning ring 41 is not in contact with these surfaces 47, 55.

Figure 5:
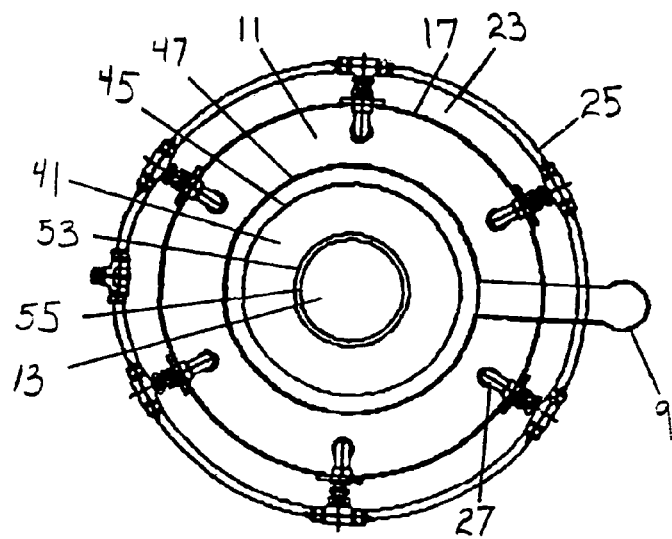
FIG. 5 is a top cross sectional view of the hazardous gas abatement system.

FIG. 5 is a top cross sectional view of the hazardous gas abatement system 1. Water sprays 27 are used for cooling and scrubbing of exhaust gases. A water scrubbing zone is positioned after the filter 19, but before exhausting the gases out of the apparatus 1 via the exhaust duct 29. The introduction of water into the system helps to further scrub the contaminated gases and cools the exit stream. Moisture may also be introduced in the earlier in the cleaning system 1 in the form of steam or water. Water sprays 27 may be reconfigured to dispense water or steam into the oxygenator 5 as well as the exit flow region 23 after the filter 19. This addition of moisture in the form of water or steam reduces contaminants in the hazardous gas stream. Moisture also reduces the possible damage to the heater compartment 7 and other components by converting fluorine gas to hydrofluoric acid. Hydrofluoric acid is less damaging to the equipment than fluorine in the gaseous form.

The present invention efficiently neutralizes, pacifies and cleans contaminated chemical process exhaust and waste gases and allows for easy cleaning of the heater compartment 7. The present invention ensures complete or substantially complete neutralization and pacification of any out flowing contaminant gas in the gas stream to be neutralized. The system is also simple and inexpensive to build and to operate and does not require a fuel source to operate. The systems is also capable of handling spent process gas streams that have contaminate gas concentrations from trace to substantial amounts in volumes of cubic centimeters to several tens or hundreds of liters per minute.

While the invention has been described with reference to specific embodiments, modifications and variations of the invention may be constructed without departing from the scope of the invention.

The invention claimed is:

1. A contaminated gas treatment apparatus comprising:
a first gas inlet for contaminant gas,
a second inlet for an oxygen source,
a heater compartment connected to the first gas inlet,
a heater in the heater compartment for heating the contaminant gas,
a heating region connected to the second inlet between an outside surface of the heater and heater compartment walls,
a cleaner mounted in the heater compartment and movable along the heater for cleaning particles from a heater surface,
a reaction region below the heater for mixing and reacting the oxygen and contaminant gases,
a filter chamber connected below the reaction region,
a filter in the filter chamber for filtering solid particulates from reacted gases, and
an exhaust connected to the filter chamber for removing reacted gas from the filter chamber.

2. The apparatus of claim 1, wherein the heater is a first heater and further comprising a second heater in the heater compartment and wherein the cleaner is movable along the length of and between the first and second heaters for cleaning particles from surfaces of the first and second heaters.

3. The apparatus of claim 2, wherein the first heater comprises an outer heater and the second heater comprises an inner heater and wherein the cleaner has an outer cleaning element for cleaning the outer heater and an inner cleaning element for cleaning the inner heater.

4. The apparatus of claim 3, further comprising an operator offset from a center of the treatment apparatus and connected eccentrically to the cleaner between the outer cleaning surface and the inner cleaning element for moving the cleaner between the outer heater and the inner heater.

5. The apparatus of claim 3, wherein the heater compartment is cylindrical, the outer heater is cylindrical and the inner heater is cylindrical, and wherein the cleaner is annular and coaxial with the outer heater and the inner heater, and further comprising an operator, offset from a center of the heater compartment and eccentrically connected to the cleaner, for moving the cleaner between the outer heater and the inner heater.

6. The apparatus of claim 5, wherein the operator further comprises a reciprocating air cylinder driver extending from an end of the treatment apparatus and a reciprocating rod extending into the heater compartment from the air cylinder driver and connected eccentrically to the annular cleaner for extending the rod in a space between the heaters as the reciprocating air cylinder moves the rod and the cleaner.

7. The apparatus of claim 5, wherein the cleaner is positioned above the first gas inlet and away from the passage of contaminant gases when not in use, and wherein the cleaner cleans entry points of the first gas inlet.

8. The apparatus of claim 5, wherein the outer heater has an inner liner with an extension beyond the outer heater, and wherein the outer cleaning element of the cleaner moves along the inner liner, and into the extension of the inner liner when the rod and the cleaner are fully extended through the heater compartment.

9. The apparatus of claim 5, wherein the second inlet is an air inlet, and wherein air flows between the outer surface of the heater and the heater compartment walls for performing dynamic oxidation, and for cooling the outer surfaces of the heater.

10. The apparatus of claim 5, wherein the exhaust further comprises an exhaust chamber connected to the filter chamber and surrounding outer heater, and an exhaust outlet connected to the exhaust chamber for removing exhaust gases from the exhaust chamber, and water sprays in the exhaust chamber for cooling and scrubbing exhaust gases in the exhaust chamber.

11. The apparatus of claim 5, wherein the filter chamber is positioned below the heater compartment for removing solids out of the exhaust gas stream, and further comprising a quick disconnect clamp between a base of the heater compartment and a top of the filter chamber for removing the filter chamber and removing, replacing or cleaning the filter.

12. The apparatus of claim 1, further comprising a moisture injector connected to the first inlet or heater compartment for adding moisture as steam or water for reducing reactivity of contaminants and minimizing damage to the heater compartment and a remainder of the apparatus.

13. The apparatus of claim 1, wherein the first inlet further comprises up to four or more contaminant gas inlets.

14. A contaminated gas treatment apparatus comprising:
   a first gas inlet for contaminant gas connected to a heater compartment,
   a moisture injector connected to the first inlet or heater compartment for adding moisture as steam or water for reducing reactivity of contaminants and minimizing damage to the heater compartment and a remainder of the apparatus,
   a heater compartment in the heater compartment for heating the contaminant gas,
   a second inlet for an oxygen source connected to a region between an outer surface of the heater and an outer wall of the heater compartment,
   a region below the heater for combining and reacting the oxygen and contaminant gas,
   a filter chamber connected to the heater compartment,
   a filter in the filter chamber for filtering solid particulates from reacted gas, and
   an exhaust connected to the filter chamber for removing reacted gas from the filter chamber treatment apparatus.

* * * * *